(12) United States Patent
Kuroda et al.

(10) Patent No.: US 7,203,023 B2
(45) Date of Patent: Apr. 10, 2007

(54) MAGNETIC RECORDING UNIT AND MAGNETIC RECORDING MEDIUM

(75) Inventors: Sumio Kuroda, Kawasaki (JP); Kazuyuki Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 217 days.

(21) Appl. No.: 10/413,660

(22) Filed: Apr. 15, 2003

(65) Prior Publication Data
US 2003/0210491 A1 Nov. 13, 2003

(30) Foreign Application Priority Data
May 7, 2002 (JP) .............................. 2002-131719

(51) Int. Cl.
*G11B 5/596* (2006.01)
(52) U.S. Cl. ................. 360/77.06; 360/75; 360/53; 360/77.08
(58) Field of Classification Search .......... 360/53, 360/77.01, 77.04, 77.06, 77.07, 48, 51, 75, 360/77.08
See application file for complete search history.

(56) References Cited

U.S. PATENT DOCUMENTS

| | | | | |
|---|---|---|---|---|
| 5,523,900 A | * | 6/1996 | Kosugi et al. ........... | 360/77.05 |
| 5,946,156 A | * | 8/1999 | Schwarz et al. ........... | 360/75 |
| 5,966,264 A | * | 10/1999 | Belser et al. ............ | 360/77.08 |
| 6,028,731 A | * | 2/2000 | Bond ..................... | 360/77.11 |
| 6,034,835 A | * | 3/2000 | Serrano .................. | 360/77.05 |
| 6,128,153 A | * | 10/2000 | Hasegawa et al. ........ | 360/77.08 |
| 6,141,163 A | * | 10/2000 | Nakamura et al. ......... | 360/51 |
| 6,452,990 B1 | * | 9/2002 | Leis et al. ................ | 375/361 |
| 6,590,729 B1 | * | 7/2003 | Akagi et al. ............. | 360/48 |
| 6,738,205 B1 | * | 5/2004 | Moran et al. ............ | 360/17 |
| 6,754,016 B2 | * | 6/2004 | Messner et al. .......... | 360/48 |
| 6,754,025 B1 | * | 6/2004 | Shepherd et al. ........ | 360/73.03 |
| 6,785,085 B2 | * | 8/2004 | Guzik et al. ............. | 360/77.08 |
| 6,961,203 B1 | * | 11/2005 | Baker ..................... | 360/77.08 |

FOREIGN PATENT DOCUMENTS

| | | |
|---|---|---|
| JP | 47-32012 | 8/1972 |
| JP | 60-10472 | 1/1985 |
| JP | 8-339649 | 12/1996 |
| JP | 9-251736 | 9/1997 |
| JP | 9-312073 | 12/1997 |

* cited by examiner

*Primary Examiner*—Andrea Wellington
*Assistant Examiner*—Dismery Mercedes
(74) *Attorney, Agent, or Firm*—Greer, Burns & Crain, Ltd.

(57) ABSTRACT

The present invention provides a magnetic recording unit, including: a magnetic head; a magnetic recording medium having a servo pattern for adjusting a position of the magnetic head; a frequency detecting element for detecting a frequency in the servo pattern on a track corresponding to the position in a radial direction of the magnetic recording medium, on the basis of a reproduction signal obtained by reading the servo pattern with the magnetic head; a storage element for storing in advance information on predetermined frequencies corresponding to the positions of tracks of the magnetic recording medium; a tracking element for comparing the frequency detected on the track by the frequency detection element and the information on the frequency corresponding to the same track, the information being stored in the storage element, and for generating a signal for adjusting the position of the magnetic head, the signal being generated on the basis of a difference between the frequencies.

7 Claims, 16 Drawing Sheets

FIG. 4

| TRACK | FREQUENCY | VOLTAGE |
|---|---|---|
| 1 | f1 | V1 |
| 2 | f2 | V2 |
| 3 | f3 | V3 |
| ⋮ | ⋮ | ⋮ |
| i | fi | Vi |
| ⋮ | ⋮ | ⋮ |
| n | fn | Vn |

FIG. 9

| TRUCK | FREQUENCY DIFFERENCE($2\triangle f$) | VOLTAGE |
|---|---|---|
| 1 | f1 | V1 |
| 2 | f2 | V2 |
| 3 | f3 | V3 |
| ⋮ | ⋮ | ⋮ |
| i | fi | Vi |
| ⋮ | ⋮ | ⋮ |
| n | fn | Vn |

41 RADIAL PATTERN

FIG. 14

| TRACK | ANGLE | | | | | | | | | | |
|---|---|---|---|---|---|---|---|---|---|---|---|
| | 0 | | θ1 | | θ2 | | ... | θi | | ... | θn | |
| | F | V | F | V | F | V | | F | V | | F | V |
| 1 | f01 | V01 | f11 | V11 | f21 | V21 | ... | fi1 | Vi1 | ... | fn1 | Vn1 |
| 2 | f02 | V02 | f12 | V12 | f22 | V22 | ... | fi2 | Vi2 | ... | fn2 | Vn2 |
| 3 | f03 | V03 | f13 | V13 | f23 | V23 | ... | fi3 | Vi3 | ... | fn3 | Vn3 |
| ... | ... | ... | ... | ... | ... | ... | | ... | ... | | ... | ... |
| i | f0i | V0i | f1i | V1i | f2i | V2i | ... | fii | Vii | ... | fni | Vni |
| ... | ... | ... | ... | ... | ... | ... | | ... | ... | | ... | ... |
| n | f0n | V0n | f1n | V1n | f2n | V2n | ... | fin | Vin | ... | fnn | Vnn |

F: FREQUENCY  V: VOLTAGE

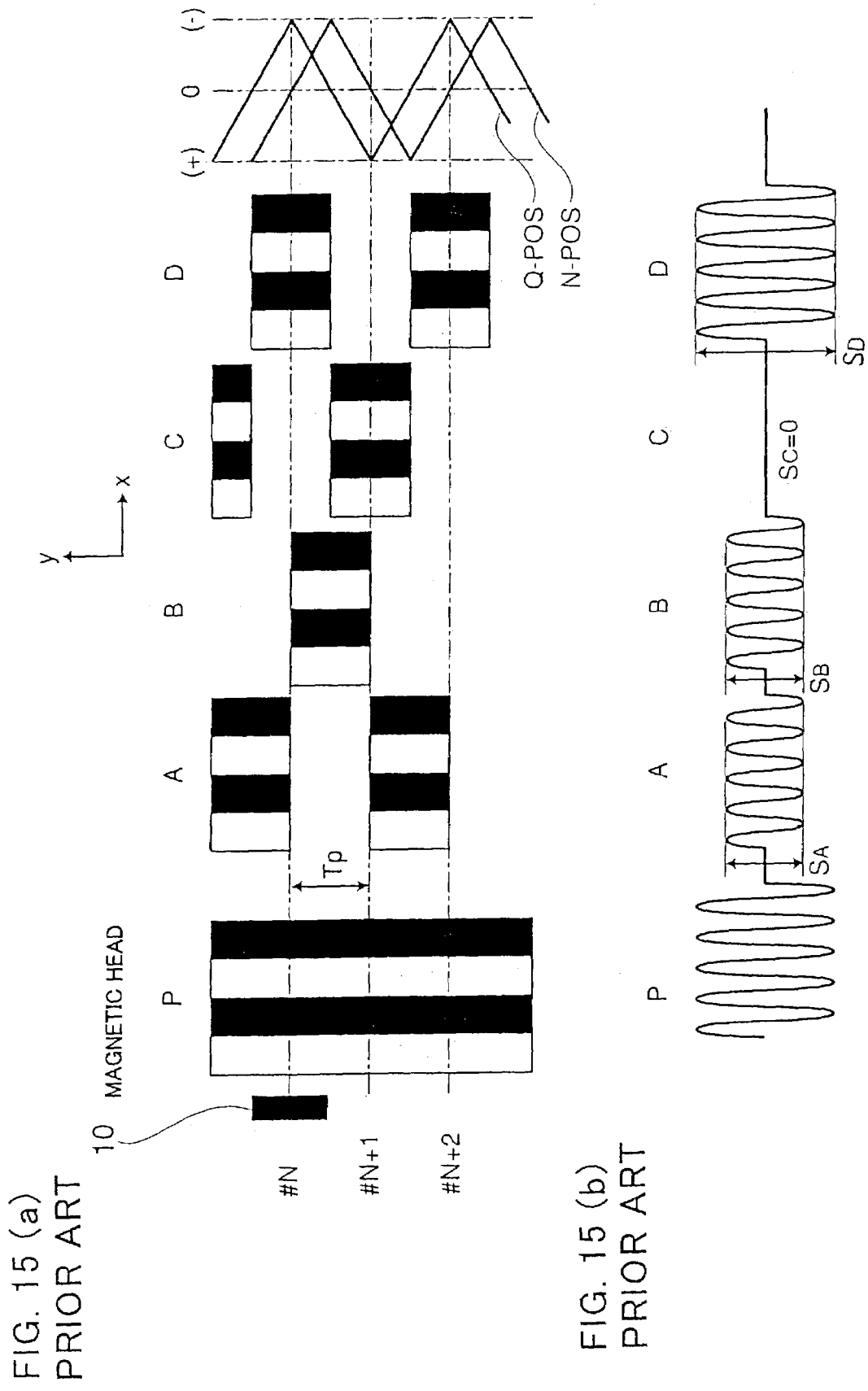
FIG. 15 (a) PRIOR ART
FIG. 15 (b) PRIOR ART

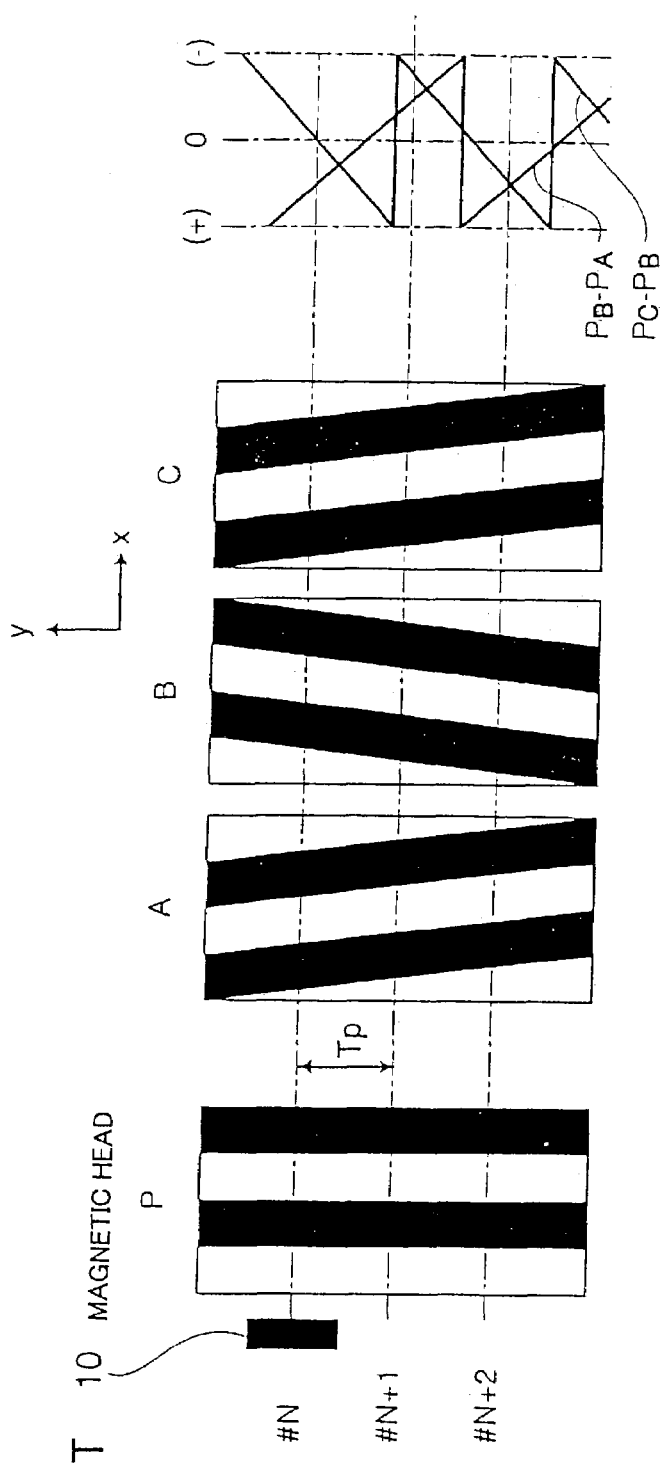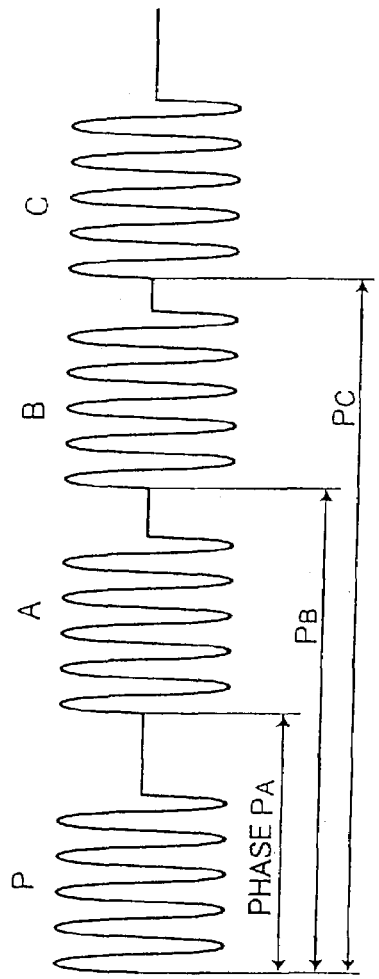
FIG. 16 (a) PRIOR ART
FIG. 16 (b) PRIOR ART

MAGNETIC RECORDING UNIT AND MAGNETIC RECORDING MEDIUM

CROSS-REFERENCE TO RELATED APPLICATION

This application is related to Japanese application No. 2002-131719 filed on May 7, 2002, whose priority is claimed under 35 USC § 119, the disclosure of which is incorporated by reference in its entirety.

BACKGROUND OF THE INVENTION

1. Field of the Invention

The present invention relates to a magnetic recording unit. More particularly, it relates to a magnetic recording unit adapted to carry out the tracking servo of a recording and reproducing head using a servo pattern recorded on a disk.

2. Description of Related Art

In conventional magnetic recording units having a magnetic head for recording and reproducing information, a servo pattern is formed on a magnetic disk for positioning the magnetic head thereon.

Conventional magnetic disks have both data regions for recording user's data and servo regions in which signals are recorded in advance for positioning the magnetic head of the magnetic recording unit. About several tens of servo regions extend radially on the magnetic disk from the center thereof at predetermined intervals.

The servo region is generally composed of a regular pattern used for automatic gain control (AGC), an index pattern indicating the beginning of a rotation, a Gray code pattern indicating a track number, and a servo pattern (also referred to as a position signal pattern) for obtaining a track positional information.

The servo pattern comprises patterns required for positioning the magnetic head of the magnetic recording unit. The patterns have, for example, a plurality of servo bits arranged in a zigzag relationship on the basis of a predetermined number of tracks. The servo bits are each read by the magnetic head to generate reproduction signals, and the amplitudes of the reproduction signals are then compared to obtain information as to where on a track the magnetic head is positioned in a width direction of the track, for adjusting the magnetic head, i.e., carrying out the tracking (Japanese Examined Patent Publication No. 47(1972)-32012).

FIGS. 15(a) and (b) are views for schematically explaining a conventional "amplitude detecting servo" system. FIG. 15(a) is a view illustrating the relationship between tracks and a servo pattern. FIG. 15(b) is a view illustrating examples of reproduction signals obtained by the magnetic head traveling on the servo pattern. The magnetic head 10 having a track width length Twr is to be positioned on a track #N. The magnetic head 10 travels in a direction of X shown in FIG. 15(a) to pass through patterns P and A–D for generating the reproduction signals as shown in FIG. 15(b). Black and white portions of each of the patterns P and A–D indicate magnetic directions of the servo pattern recorded on a magnetic recording medium that are opposite to each other. In other words, if the magnetic recording medium is an in-plane recording medium, the black and white portions of the servo pattern indicate vectors opposite to each other that have in-plane components in the track direction X, and if the magnetic recording medium is a perpendicularly recording medium, the black and white portions of the servo pattern indicate vectors opposite to each other that have components perpendicular to a surface of the magnetic recording medium. These patterns are shown schematically in FIG. 15(a) and the actual signal periods thereof are shown in FIG. 15(b).

When a difference between the amplitude $S_A$ of a reproduction signal of a pattern A and the amplitude $S_B$ of a reproduction signal of a pattern B is calculated, i.e., a subtraction $S_A-S_B$ is done, and the magnetic head 10 is moved in a track width direction y, the result is a signal N-POS shown on the right of FIG. 15(a). Likewise, when the difference between the amplitude $S_C$ of a reproduction signal of a pattern C and the amplitude $S_D$ of a reproduction signal of a pattern D is calculated, i.e., a subtraction $S_C-S_D$ is done, and the magnetic head 10 is moved in the track width direction y, the result is a signal Q-POS shown on the right of FIG. 15(a). Then, by properly utilizing the above signals N-POS and Q-POS as position signals, the current position of the magnetic head 10 can be grasped.

A "phase detecting servo" system, another conventional servo system, is disclosed in Japanese Unexamined Patent Publication No. 60(1985)-10472). FIGS. 16(a) and (b) are views for schematically explaining the "phase detecting servo" system. The magnetic head 10 having with the track width Twr is to be positioned on the track #N. The magnetic head 10 travels in the direction of X shown in FIG. 16(a) to pass through the patterns P and A–C for generating reproduction signals as shown in FIG. 16(b). The black and white portions of each of the patterns P and A–C have the same meanings as in FIG. 15(b). The patterns have an azimuth angle of tilt for the magnetic head 10, though the angle is too small to cause a problem of degradation (azimuth loss) in the reproduction signals and therefore, the waveform of each reproduction signal is regarded as being almost the same as that in FIG. 15(b). The phase of each of the patterns A, B and C from the pattern P, however, varies depending on where in the track width direction (y) the phase is measured. Here, the phases of the patterns A, B and C on the track #N are given as $P_A$, $P_B$ and $P_C$, respectively. These patterns are shown schematically in FIG. 16(a) and the actual signal periods thereof are shown in FIG. 16(b).

When the respective phase differences $P_B-P_A$ and $P_C-P_B$ are calculated, an example of the result in the y direction is shown on the right of FIG. 16(a). By properly utilizing the above signals $P_B-P_A$ and $P_C-P_B$ as position signals, the current position of the magnetic head 10 can be grasped. Japanese Unexamined Patent Publication No. Hei 9(1997)-312073, for example, discloses a method for obtaining the phases $P_A$, $P_B$ and $P_C$ from reproduction signals of FIG. 16(b). In a pattern of this phase detecting servo system, one period is composed of a large number of tracks, so that code information indicating the position of the magnetic head on the disk is reduced in amount in comparison with that of a pattern of the amplitude detecting system.

Today, a demand has been made for further increasing the recording density by decreasing the unit data bit intended for storage or by lowering a ratio of the servo region to the disk even slightly.

In conventional servo detecting systems as mentioned above, however, it is difficult to increase the recording density while maintaining the reliability in recording and reproducing.

Conventionally, information in the servo region is recorded using a servo track writer (STW). The servo track writer, however, requires a long time for recording information since it employs magnetic head. In order to solve this problem, there has been proposed a servo information transfer method for transferring the servo pattern information and the like recorded on a master disk to a slave disk all at once using a magnetic transfer technique in a shorter time than conventionally.

In this method, however, it is difficult to carry out a uniform transfer when a master disk and a slave disk are not in sufficient contact because of the presence of dust or the like. In a non-uniform transfer, when the servo pattern is reproduced with the magnetic head, reproduction signals varying in amplitude are generated, resulting in insufficient positional reliability. This problem becomes more outstanding as the density of the servo pattern is increased.

Also, when a misalignment occurs between the slave disk and the master disk, an eccentric slave disk may possibly be produced.

SUMMERY OF THE INVENTION

The present invention provides a magnetic recording unit, comprising: a magnetic head; a magnetic recording medium having a servo pattern for adjusting a position of the magnetic head; a frequency detecting element for detecting a frequency in the servo pattern on a track corresponding to the position in a radial direction of the magnetic recording medium, on the basis of a reproduction signal obtained by reading the servo pattern with the magnetic head; a storage element for storing in advance information on predetermined frequencies corresponding to the positions of tracks of the magnetic recording medium; a tracking element for comparing the frequency detected on the track by the frequency detection element and the information on the frequency corresponding to the same track, the information being stored in the storage element, and for generating a signal for adjusting the position of the magnetic head, the signal being generated on the basis of a difference between the frequencies.

According to the above construction, because frequencies are detected utilizing the servo pattern, a ratio of the servo region to the overall magnetic recording medium can be reduced to a smaller one than conventionally, whereby the recording density can be improved.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a table of frequencies to be related to the magnetic disk of the present invention;

FIG. 9 shows a table of frequencies to be related to the magnetic disk of the present invention;

FIG. 14 shows a table of intended frequencies of Embodiment 4 of the present invention;

FIG. 15 is schematic view for explaining a conventional "amplitude detection servo" system.

FIG. 16 is schematic view for explaining a conventional "phase detection servo" system.

DESCRIPTION OF THE PREFERRED EMBODIMENTS

Figure 1:
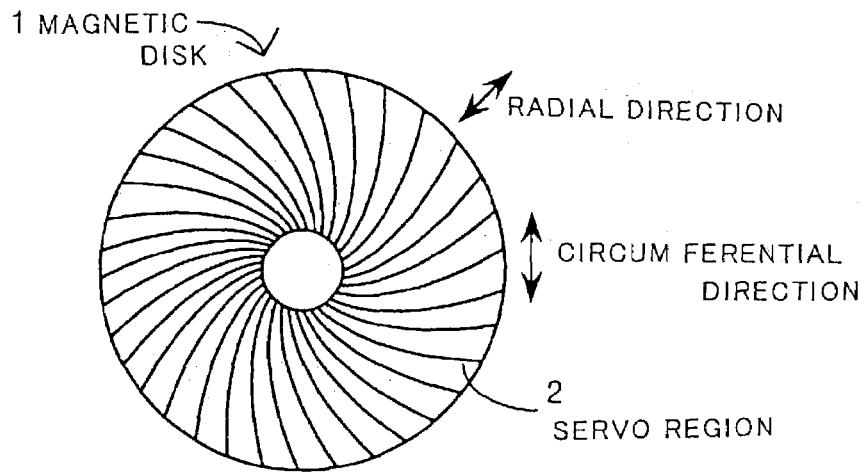
FIG. 1 is a view for explaining Embodiment 1 of the servo pattern of the magnetic disk of the present invention.
Figure 1:
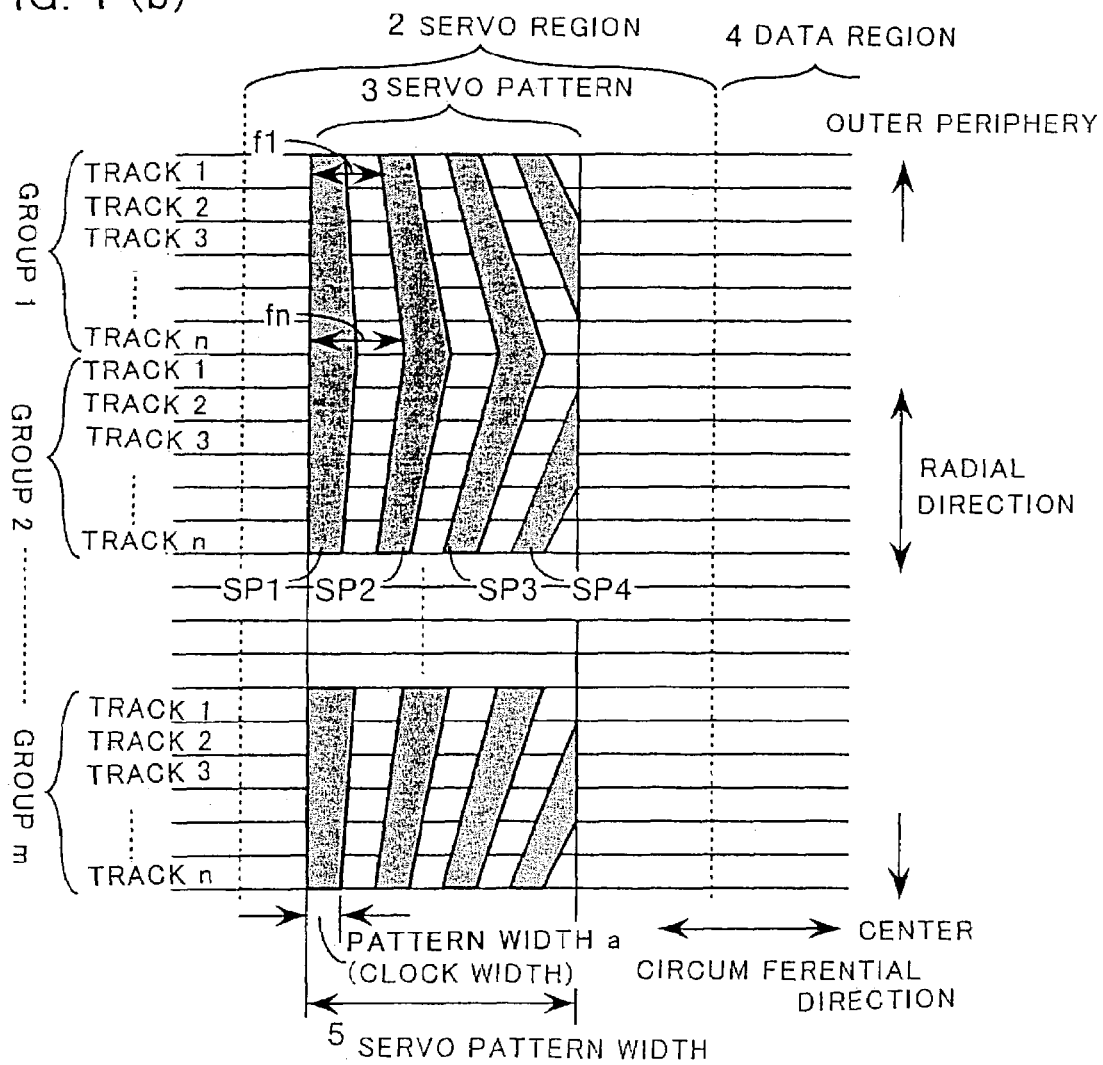

The present invention provides a magnetic recording unit in which the recording density can be increased by lowering a ratio of the servo region to the overall disk and an accurate tracking can be carried out even with an eccentric disk that is prepared by a magnetic transfer method.

The servo pattern may be an elongated pattern crossing the tracks and have a length varying circumferentially of the magnetic recording medium continuously within a track group consisting of a predetermined number of tracks, and frequency information different for each track may be stored in the storage element.

Further, the servo pattern may be an elongated pattern crossing the tracks and have a length varying circumferentially of the magnetic recording medium discretely within the track group consisting of the predetermined number of tracks, and frequency information for each track may be stored in the storage element.

Also, the servo pattern may be an elongated pattern crossing the tracks, have a length varying circumferentially of the magnetic recording medium continuously within the track group consisting of the predetermined number of tracks and consist of a first burst and a second burst arranged side by side circumferentially of the magnetic recording medium, the first burst and the second burst having opposite tendencies of change in length, and information on frequencies in the first burst and the second burst may be stored for each track in the storage element.

According to the above-mentioned magnetic recording unit, since the servo pattern consists of two bursts having different tendencies of change in circumferential length, an accurate tracking can be carried out even with an eccentric magnetic recording medium that is produced by a magnetic transfer method or the like to be mounted on the unit.

Moreover, the servo pattern may be an elongated pattern crossing the tracks, have a length varying circumferentially of the magnetic recording medium discretely within the track group consisting of the predetermined number of tracks and consist of a first burst and a second burst arranged side by side circumferentially of the magnetic recording medium, the first burst and the second burst having opposite tendencies of change in length, and information on frequencies in the first burst and the second burst may be stored for each track in the storage element.

Further, even if especially the magnetic recording medium is a disk-shaped medium that is eccentric with a center of rotation shifted from the designed center of rotation, an accurate tracking can be carried out.

Also, the magnetic recording medium may be a disk-shaped medium having radial patterns arranged around the periphery of the magnetic recording medium, and the frequency detection element may read the radial patterns on one rotation of the magnetic recording medium to measure a frequency for the one rotation, and, in the presence of variation in the frequency measured on one rotation, compare the measured frequency with a frequency to be detected in the absence of variation to correct the frequency information stored in the storage element. According to the above construction, an accurate tracking can be carried out even when the medium is eccentric.

Moreover, the present invention provides a magnetic recording medium having a servo pattern for adjusting the position of a magnetic head, wherein the servo pattern is an elongated pattern crossing the tracks and has a length varying circumferentially of the magnetic recording medium continuously within a track group consisting of a predetermined number of tracks. The length of the servo pattern circumferential of the magnetic recording medium may vary discretely.

Further, the present invention provides magnetic recording medium having a servo pattern for adjusting the position of a magnetic head, wherein the servo pattern is an elongated pattern crossing the tracks, has a length varying circumferentially of the magnetic recording medium continuously, and consists of a first burst and a second burst arranged side by side circumferentially of the magnetic recording medium, the first burst and the second burst having opposite tendencies of change in length. The length of the servo pattern circumferential of the magnetic recording medium may vary discretely.

The magnetic recording medium is divided into two regions: One is a data region for recording user's data, and the other is a servo region for positioning the magnetic head on the medium and for recording information on classification of the locations of the tracks and sectors. The servo region is a region in which as conventionally various information is stored. The present invention has a feature in a servo pattern and further in that the servo pattern is used to detect a frequency for carrying out the tracking.

When the magnetic head travels the designed track, it detects a frequency itself as set in advance. However, the magnetic head may travel slightly off the designed track due to disturbances in the unit's vibration and temperature changes. In such cases, a frequency is detected that is different from the set frequency. Therefore, on the basis of the frequency difference between the set frequency and the detected frequency, a signal for adjusting the position of the magnetic head to the originally designed track is generated, and, on the basis of the position adjusting signal, a fine adjustment of the position of the magnetic head (the tracking) is carried out.

According to the present invention, the servo region is an elongated pattern that crosses tracks, and, in a disk-shaped medium, it is a radially elongated pattern. The servo pattern included in the servo region is also a radially elongated pattern. According to the present invention, however, for reducing the area of the servo pattern to an area as small as possible, the servo pattern is preferably formed periodically radially of the disk.

In other words, several tens of tracks are coaxially formed radially of the medium, and the servo patterns are formed periodically for a predetermined number of tracks. The predetermined number of tracks are called track group or group n. The circumferential length of the servo pattern need vary sequentially or discretely within one group. This is for detection of different frequencies from adjacent tracks within one group.

The frequency detection element of the present invention may be a PLL (Phase Locked Loop) circuit, or, in place of this, may be a DFT (Digital Fourier Transfer) (Japanese Unexamined Patent Publication No. Hei 9(1997)-312073).

The present invention will now be explained in detail based on the preferred embodiment shown in the drawings. It should be understood that the present invention is not limited to the embodiment.

Embodiment 1

FIGS. 1(a) and (b) are views for explaining a servo pattern according to Embodiment 1 of the present invention.

FIG. 1(a) is a plan view of a magnetic disk 1 according to the present invention. As shown in this drawing, linear servo regions 2 that extend radially of the magnetic disk 1 from the center are arranged equidistantly in a circumferential direction.

The servo region 2 is comprised of an index pattern of fixed period, a Gray code pattern, a servo pattern and the like, as conventionally. In the following embodiments according to the present invention, explanations will be made on the servo pattern, of the servo region, that is used for positioning the magnetic head, with attention paid to the form of the servo pattern.

FIG. 1(b) is an enlarged view of the servo region 2 of FIG. 1(a), particularly showing part of a servo pattern 3.

The magnetic disk 1 has a plurality of tracks formed coaxially therein. The servo pattern 3 is formed radially of the magnetic disk 1 to cross the tracks. In FIG. 1(b), the servo pattern 3 has four servo patterns SP1, SP2, SP3 and SP4 arranged within a servo pattern width 5.

Also, the servo pattern 3 has groups each composed of n tracks when viewed radially of the magnetic disk 1. In FIG. 1(b), the servo pattern 3 has m track groups. When attention is paid to one group, the servo pattern 3 is continuously changed in circumferential pattern width (also called clock width) a from a track 1 to a track n. Namely, the servo pattern 3 is changed in the frequency of a burst.

In a group 1 of FIG. 1(b), for example, the servo pattern 3 is continuously changed so that the pattern width a is the smallest on the track 1 and the largest on the track n. Thus, when the period of the servo pattern on the track 1 within the group 1 is given as $t_1$ and the period of the servo pattern on the track n within the group 1 is given as $t_n$, there is established $t_1 < t_n$.

In other words, a frequency of the servo pattern on the most outer radius track 1 within the group 1 is given as $f_1$ and a frequency of the servo pattern on the most inner radius track n within the group 1 is given as $f_n$, there is established $f_1 > f_n$.

Ideally, the magnetic head travels the middle of each track circumferentially of the magnetic disk to read the servo pattern 3 for generating a reproduction signal.

The frequency of a reproduction signal to be generated from the servo pattern on a track is decided according to the pattern width a on the track. Therefore, the frequency to be detected from the reproduction signal varies according to the location of the track. A frequency $f_i$ to be detected in an i-th track within a group is generally expressed by the following formula:

$$f_i = f_1 + (f_1 - f_n) \times (2i-1)/n,$$

wherein the frequencies $f_1$, $f_i$ and $f_n$ are obtained when the magnetic head ideally travels the middle of a track, the ideal route, and these ideal frequencies can be decided in advance at the designing of the servo pattern.

FIG. 4 shows a table of a relation between the ideal frequency to be detected for each track and the voltage value of an ideal signal B to be outputted from a later-mentioned digital-to-analog converter in correspondence with the ideal frequency. This table is stored in advance in a storage element such as the RAM or ROM.

When the magnetic head travels the middle of the track, the position of the magnetic head need not be radially adjusted since a frequency equal to the ideal frequency is detected from the reproduction signal. When the magnetic head deviates upward or downward from the middle of the track, however, a frequency fx is detected that is different from the ideal frequency. The difference between the ideal frequency and the detected frequency fx is in a one-to-one correspondence with an amount by which the magnetic head radially deviates from the middle of the track. Therefore, calculation of this frequency difference ($\Delta fi = fx - fi$) makes it possible to adjust the magnetic head, i.e., to carry out the tracking.

Figure 5:
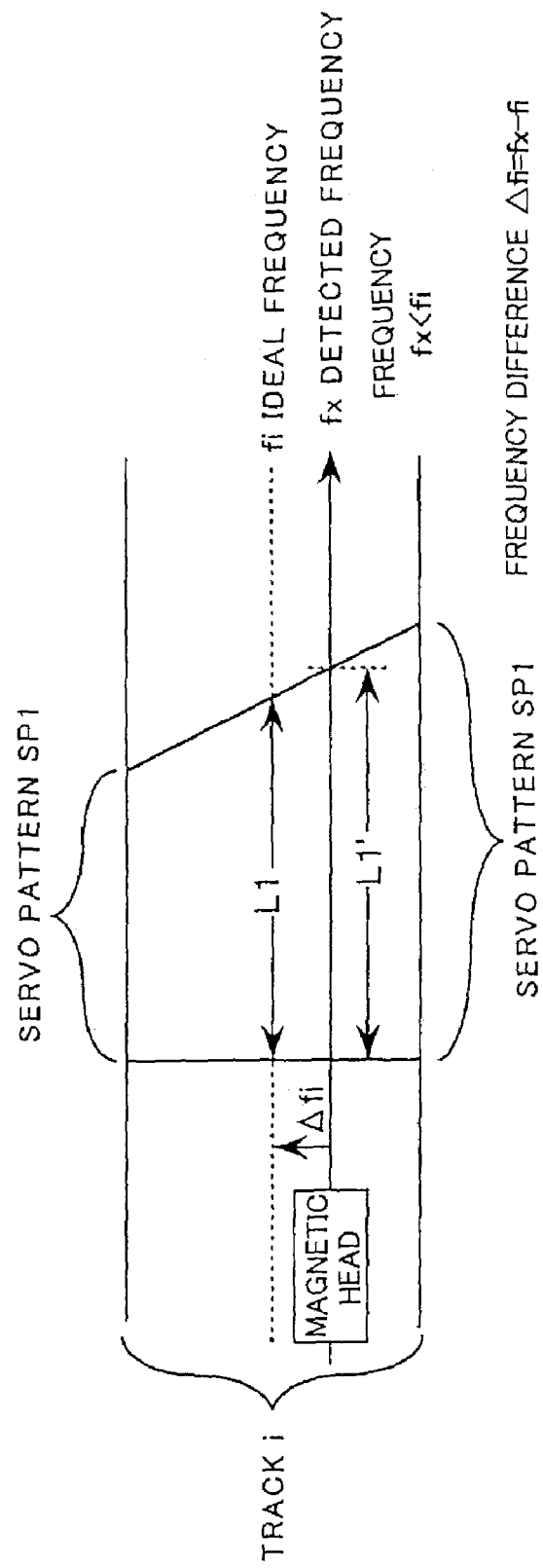
FIG. 5 is a view for comparing the frequencies and explaining the tracking according to the present invention.

FIG. 5 is a view for explaining a comparison between frequencies to be detected according to one embodiment of the present invention, as well as the tracking.

In this drawing, the track i is partially enlarged, and only the servo pattern SP1 in the servo regions 2 is shown. When the magnetic head travels the middle of the track i, i.e., on a dotted line in the drawing, the frequency fi is detected that is stored in correspondence with the track i in the table of FIG. 4.

Here, the frequency fi corresponds to a pattern width L1 of the servo pattern SP1.

When the magnetic head travels slightly downward from the middle of the track i, on the other hand, the frequency fx is detected that corresponds to a pattern width L1' of the servo pattern SP1. From a pattern width relationship L1'>Li, a frequency relationship fx<fi is derived.

The frequency difference $\Delta fi = fx - fi$ is in a one-to-one correspondence with an amount by which the magnetic head deviates upward or downward. Therefore, by calculating the frequency difference $\Delta fi$, that is an amount by which the magnetic head should be adjusted, and shifting the magnetic head upward or downward (in the case of FIG. 5, upward) by the amount, it is possible to adjust the magnetic head to be positioned in the middle of the track i.

Figure 3:
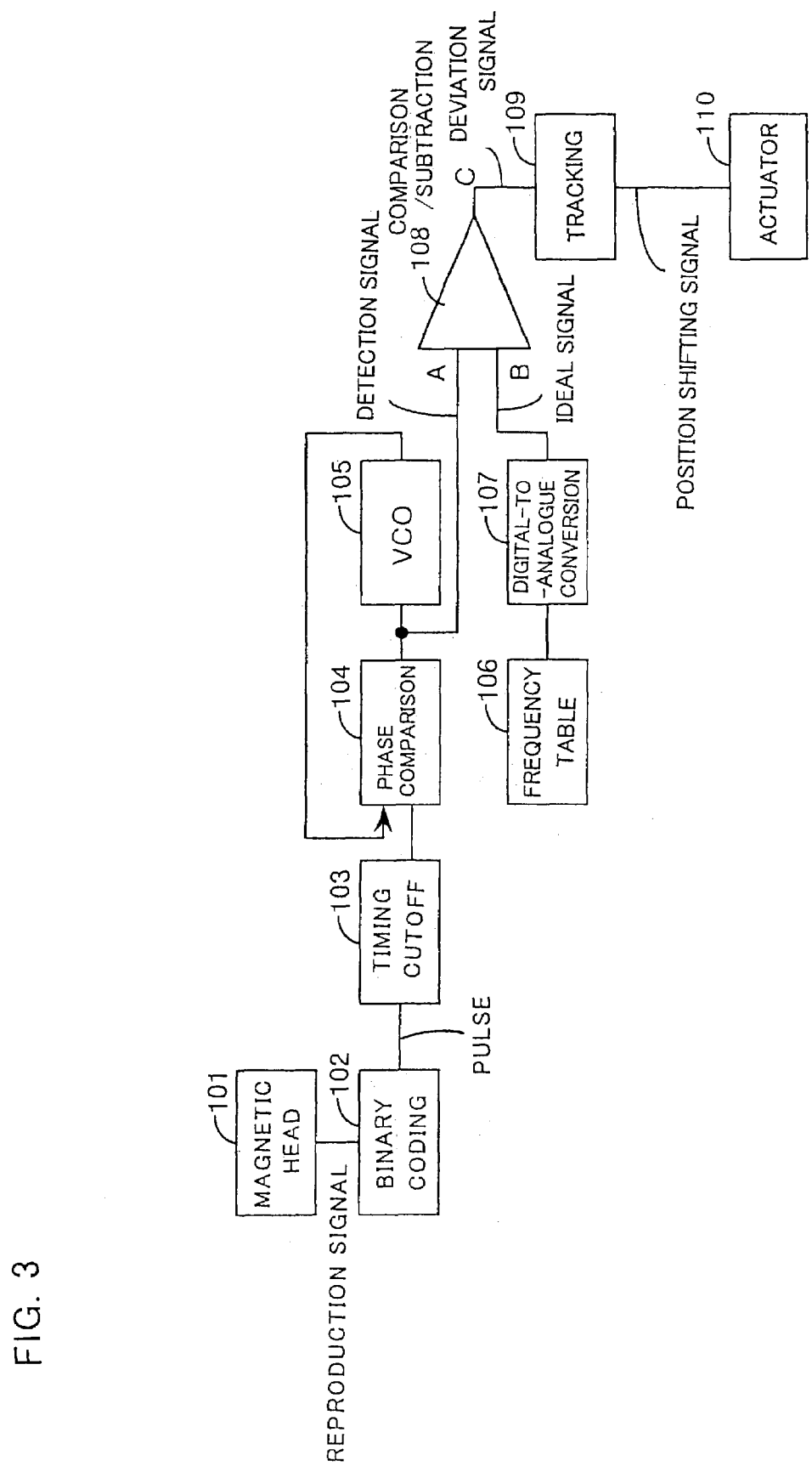
FIG. 3 is a block diagram of the constitution of a magnetic recoding unit of Embodiment 1 of the present invention.

FIG. 3 shows a block diagram of the construction of a circuit for part of a tracking operation according to one embodiment of the present invention.

Referring to FIG. 3, sections from a magnetic head 101 through a VCO 105 are operated to generate a detection signal A having a frequency corresponding to a position of the magnetic head.

A frequency table 106 and a digital-to-analog converter 107 are used to output a voltage value Vi (the ideal signal B) stored in paired relationship with the ideal frequency fi corresponding to the track i to be tracked by the magnetic head. A comparator 108 compares the detection signal A with the ideal signal B, i.e., subtracts the detection signal A from the ideal signal B to get a deviation signal C that corresponds to the frequency difference $\Delta fi$.

A tracking circuit 109, on reception of the deviation signal C, generates a position shifting signal to inch or jog an actuator 110 connected to the magnetic head 101.

More specifically, once the magnetic head 101 traverses the servo pattern on the track i, a reproduction signal is generated, which is then sent to a binary-coding circuit 102. The binary-coding circuit 102 then detects rises and falls of the reproduction signal to generate a pulse signal, which is outputted to a timing cutoff section 103. The timing cutoff section 103 cuts off some portions of the pulse signal other than corresponding to the servo pattern 3 out of the pulse signal corresponding to the servo region, and sends, to a phase comparator 104, only the portions corresponding to the servo pattern 3.

Subsequently, the portions of the pulse signal corresponding to the servo pattern 3 are sent to a PLL circuit comprising the phase comparator 104 and the VCO 105, where the detection signal A of a voltage value corresponding to a frequency detected by the magnetic head 101 is generated. The detection signal A is then outputted from the phase comparator 104 to the comparator 108.

On the other hand, the voltage value Vi corresponding to the same track i is read out from the frequency table 106 shown in FIG. 4 and sent to the digital-to-analogue converter 107, from which the ideal signal B of an analogue voltage is then outputted to the comparator 108.

The comparator 108 subtracts the detection signal A from the ideal signal B to get the deviation signal C. The deviation signal C corresponds to the frequency difference $\Delta fi$ explained referring to FIG. 5. The deviation signal C is outputted to a tracking section 109, from which the position shifting signal for inching the actuator 110 is then outputted to the actuator 110. The actuator 110, on receiving the position shifting signal, shifts the position of the magnetic head by a distance indicated by the position shifting signal to carry out the tracking.

As mentioned above, according to the present invention, the tracking is carried out by reading out the servo pattern recorded on the magnetic disk, detecting a signal corresponding to a frequency varying depending on where in the servo pattern the frequency is detected, and comparing the signal with a signal corresponding to an ideal frequency.

In FIG. 1(b), the magnetic disk has four servo patterns (SP1 to SP4), but the number of the servo patterns is not limited to this if it is more than two in principle. In order to realize a stable tracking, however, the servo pattern width 5 need be of at least about 80 clock, and in this case, the servo region 2 in which the Gray code pattern and the like are included as well need be about 1040 clock wide.

One clock width in each servo pattern is, for example, about 0.25 μm.

According to the present invention, the ratio of the servo pattern to the disk can be reduced to one thirds of that obtained with conventional amplitude detecting methods where the servo pattern width 5 need be of at least 240 clock (the servo region need be 1200 clock wide). Thereby, the recording density can be improved.

The form of the servo pattern is not particularly limited to that shown in FIG. 1(b), but may be any if it allows frequencies different from one track to another to be detected. Preferably, the form of the servo pattern is such that the pattern width is changed continuously from one track to an adjacent one in order to keep continuity in phase.

According to Embodiment 1, a magnetic recording unit can be provided that is improved in recording density of user's data though the servo pattern width 5 of FIG. 1 is smaller than conventionally since the recording and reproducing reliability is maintained at the same level as conventionally for carrying out the tracking.

Referring to FIG. 3, the PLL circuit is employed for detection of frequencies, but instead of this, a DFT circuit may be employed to carry out a digital sampling for detection of frequencies (see Japanese Unexamined Patent Publication No. Hei 9(1997)-312073).

Embodiment 2

Figure 6:
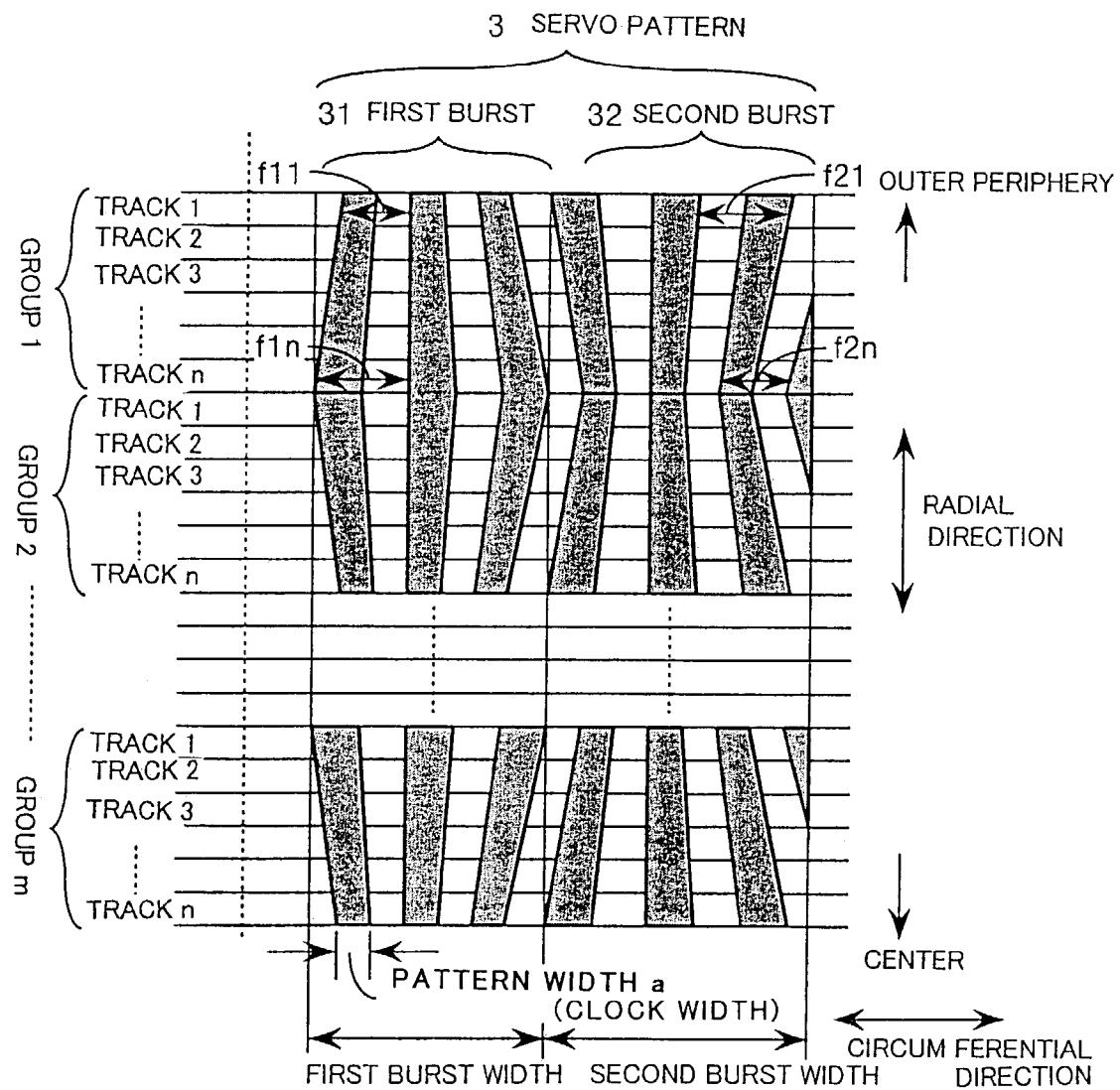
FIG. 6 is a view for explaining Embodiment 1 of the servo pattern of the magnetic disk of the present invention.

FIG. 6 is a view for explaining a servo pattern according to Embodiment 2 of the present invention.

Figure 2:
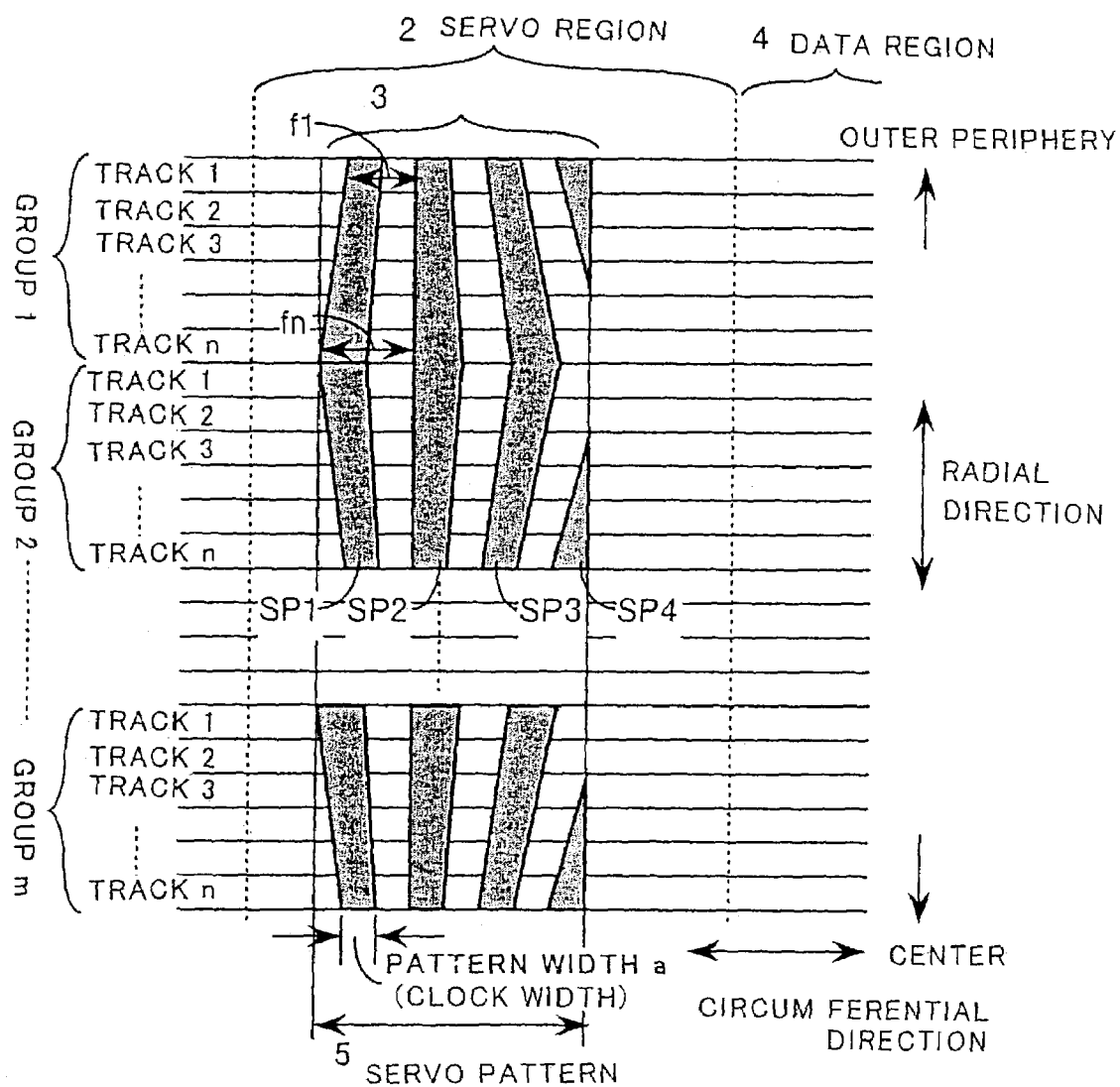
FIG. 2 is a view for explaining Embodiment 1 of the servo pattern of the magnetic disk of the present invention.

Referring to FIG. 6, the servo pattern consists of two burst patterns (first burst 31 and second burst 32). The first burst 31 is the same as the pattern shown in FIG. 2, whereas the second burst 32 is a pattern obtained by inverting the tendency in frequency change of the first burst 31 within the same group. For example, between the frequency $f_{11}$ on the track 1 and the frequency $f_{1n}$ on the track n, a relationship $f_{11} > f_{1n}$ is established for the first burst 31 within the group 1, whereas between the frequency $f_{21}$ on the track 1 and the frequency $f_{2n}$ on the track n, a relationship $f_{21} < f_{2n}$ is established for the second burst 32. In other words, the first burst 31 has an increasing tendency in frequency change, whereas the second burst 32 has a decreasing tendency in frequency change.

The servo pattern 3 of this embodiment is twice as large in the servo pattern width 5 as the servo pattern shown in FIG. 1(b), and occupies a larger area than that of the servo pattern shown in FIG. 1(b). However, the servo pattern of this embodiment is useful when employed with the above-mentioned magnetic transfer technique or with a magnetic disk that may possibly form eccentricity, for example, a servo-embedded type magnetic disk.

When the magnetic disk has the servo pattern of FIG. 6, an accurate tracking can be carried out even if the disk is eccentric, because the eccentricity of the disk can be detected on a later mentioned principle for generation of a deviation signal corresponding to an amount of eccentricity.

A sufficient servo pattern width for each of the first burst 31 and the second burst 32 of FIG. 6 is 80 clock, and therefore for the servo pattern 3, a 160 clock width is required. In this case as well, the ratio of the servo pattern to the disk can be reduced to a smaller one than conventionally.

Hereafter, an explanation will be given on the tracking that employs the servo pattern of FIG. 6.

First, suppose that the disk is not eccentric. Two kinds of frequencies are detected by the magnetic head on the track i: a frequency in the first burst 31 and a frequency in the second burst 32.

For example, the frequencies to be detected in the first and second bursts of the servo pattern are represented by the following equations, respectively:

$$f_{1i} = f_{1l} + (f_{1n} - f_{1l}) \times (2i-1)/n, \text{ and}$$

$$f_{2i} = f_{2l} + (f_{2n} - f_{2l}) \times (2i-1)/n,$$

wherein $f_{1l}$ and $f_{1n}$ are frequencies to be detected in the middle of the most outer radius track 1 and in the middle of the most inner radius track n, respectively, in the first burst 31, and $f_{2l}$ and $f_{2n}$ are frequencies to be detected in the middle of the most outer radius track 1 and in the middle of the most inner radius track n, respectively, in the second burst 32.

For these two kinds of frequencies, the detection signal A is compared with the ideal signal B that corresponds to an ideal frequency stored in the table of FIG. 4, as in Embodiment 1, whereby the tracking can be carried out. In this case, since two kinds of frequencies are detected for the tracking, the tracking accuracy can be improved.

Next, an explanation will be given on the tracking when disk is eccentric.

Figure 7:
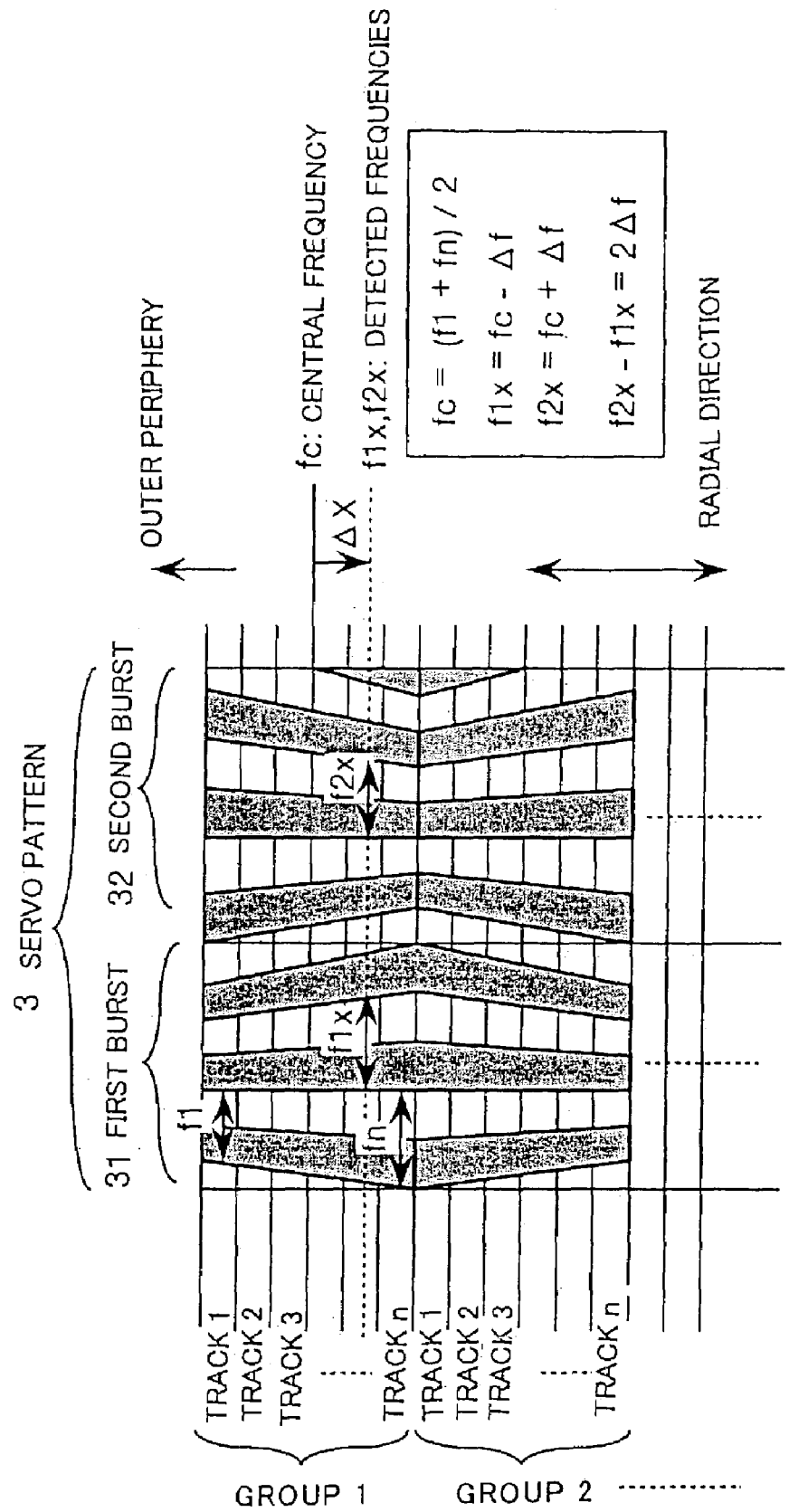
FIG. 7 is a view for explaining change in frequency when the disk is eccentric according to Embodiment 2 of the present invention.

FIG. 7 is a view for explaining a change in frequency when the disk is eccentric according to Embodiment 2 of the present invention.

The servo pattern of FIG. 7 is identical to that of FIG. 6.

Now, a frequency to be detected when the magnetic head traverses the middle of the group 1 as a whole is given as fc (hereafter, referred to a central frequency).

A frequency to be detected on the track 1 in the first burst is given as $f_1$, a frequency to be detected on the track n in the first burst is given as $f_n$, and then an equation $f_c = (f_1 + f_n)/2$ is established.

The magnetic head travels on a dotted line in the drawing that deviates from the middle of the group 1 toward the center of the disk by a distance ΔX. The distance ΔX corresponds to a frequency change amount that is given as Δf.

Therefore, referring to FIG. 7, a frequency lower than the central frequency $f_c$ by Δf is detected in the first burst 31, whereas a frequency higher than the central frequency $f_c$ by Δf is detected in the second burst 32.

That is, the frequency $f_{1x} = f_c - \Delta f$ is detected in the first burst 31 and the frequency $f_{2x} = f_c + \Delta f$ is detected in the second burst 32.

In other words, from the first burst and the second burst there are unexceptionally detected the frequencies $f_{1x}$ and $f_{2x}$, respectively, that are obtained by either adding to or subtracting from the central frequency $f_c$, the frequency difference Δf corresponding to Δx as an arbitrary value. Further, from the above equations $f_{1x} = f_c - \Delta f$ and $f_{2x} = f_c + \Delta f$, there is unexceptionally established $f_{2x} - f_{1x} = 2\Delta f$.

This equation indicates that the frequency difference ($f_{2x} - f_{1x}$) between the frequency in the first burst and the frequency in the second burst is equal to twice the frequency change amount (that is, 2Δf), the frequency change amount corresponding to the distance ΔX.

The central frequency of an eccentric disk is changed from the central frequency $f_c$ of a non-eccentric disk by a predetermined amount.

The central frequency of the eccentric magnetic disk is given as $f_c'$, and then the frequencies $f_{1x}$ and $f_{2x}$ to be detected on a line deviating from the middle of the group 1 by the distance ΔX are also deviated by ±Δf($f_{1x} = f_c' - \Delta f$ and $f_{2x} = f_c' + \Delta f$). Therefore, the frequency difference ($f_{2x} - f_{1x}$) is equal to the frequency difference 2Δf as obtained when the disk is not eccentric.

Accordingly, when the servo pattern of FIG. 6 is employed, it is possible to carry out the tracking by detecting the frequency change associated only with a route the magnetic head follows, regardless of whether or not the magnetic disk is eccentric. According to Embodiment 2, therefore, even when the disk is eccentric, an accurate tracking can be carried out, which allows stable recording and reproducing.

FIG. 9 shows an example of a frequency table that stores the frequency difference 2Δf to be detected according to Embodiment 2 of the present invention. In this table, the voltage value is stored in paired relationship with twice the amount frequency change (that is, 2Δf), the amount frequency change corresponding to the distance ΔX in each track.

Figure 8:
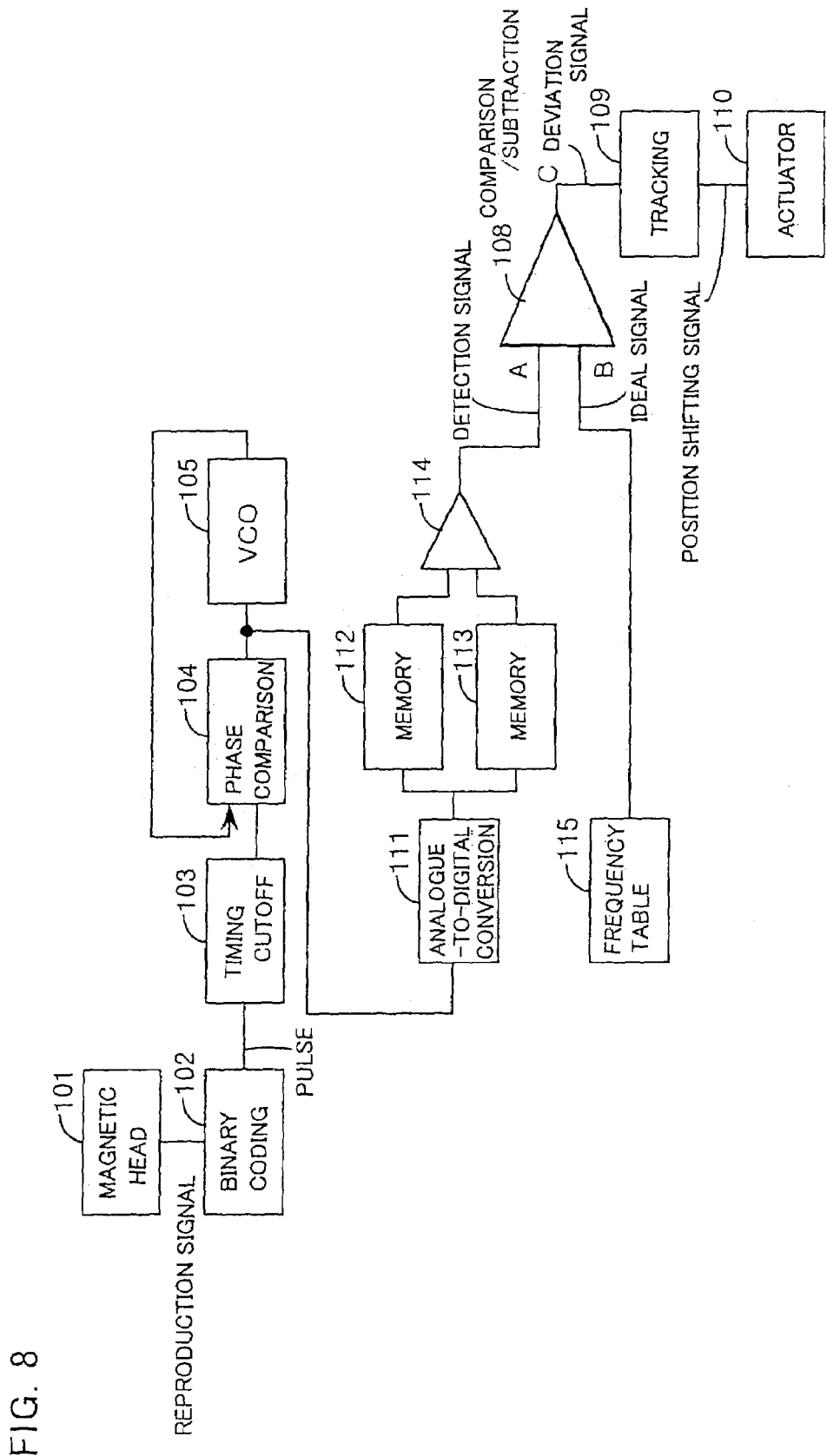
FIG. 8 is a block diagram of the constitution of a magnetic recoding unit of Embodiment 2 of the present invention.

FIG. 8 is a block diagram of the construction of a magnetic recording unit according to Embodiment 2 of the present invention. In this drawing, following the PLL circuit in FIG. 3, memories 112 and 113 are provided for recording digitalized voltage values corresponding to frequencies to be detected in the first burst 31 and the second burst 32, as well as an analogue-to-digital converter 111 and a subtracter 114. A frequency table 115 means a table shown in FIG. 9.

A voltage obtained from the first burst 31 as an output from the phase comparator 104 of the PLL circuit is converted by the analogue-to-digital converter 111 to give a digital voltage value, which is stored in the memory 112. Likewise, a voltage obtained from the second burst 32 is converted by the analogue-to-digital converter 111 to give a digital voltage value, which is stored in the memory 113. The values thus stored in the memories 112 and 113 are sent to the subtracter 114, where a subtraction of these voltage values is carried out to give a frequency difference voltage value (the detection signal A) corresponding to the frequency difference $2\Delta f$. The voltage value is output from the subtracter 114 to the comparator 108.

Also, from the frequency table 115, a voltage value (the ideal signal B) corresponding to the frequency difference $2\Delta f$ obtained when the magnetic head travels on the line deviating from the middle of the group 1 by the distance $\Delta X$ is outputted to the comparator 108.

Then, the deviation signal C is outputted from the comparator 108 as in FIG. 3 for carrying out the tracking.

Embodiment 3

Figure 10:
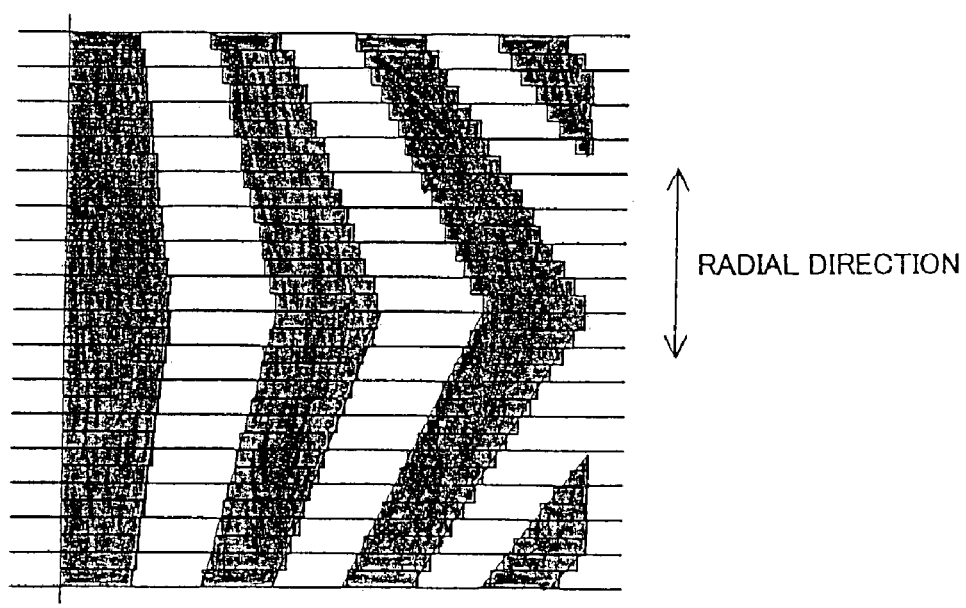
FIG. 10 is a view for explaining a servo pattern of Embodiment 3 of the present invention.

FIG. 10 is a view for explaining one example of a servo pattern according to Embodiment 3 of the present invention.

The servo pattern is the same as the servo pattern shown in FIG. 1 except that the frequency on each track is changed discretely.

Referring to FIG. 10, two rectangular patterns are arranged within a track, but three or more rectangular patterns may be arranged within a track. When two rectangular patterns are arranged within a track, the frequency is changed in units of half of a track pitch (track pitch=0.3 μm).

On the track 1 of FIG. 10, for example, two frequencies $f_{1a}$ and $f_{1b}$ are detected.

That is, when the magnetic head travels the track 1, the frequencies $f_{1a}$ and $f_{1b}$ are detected at the upper half and at the lower half of the track 1, respectively.

The two frequencies $f_{1a}$ and $f_{1b}$ is detected from the relationship between a core width of the magnetic head and a unit radial width of the rectangular pattern, and each of the frequencies $f_{1a}$ and $f_{1b}$ is then compared with an ideal frequency of the ideal target track table 115 to determine ±0.5 track deviation from a target track (to determine into which of the upper or lower half of a target track the magnetic head deviates). For deviation not exceeding ±0.5 track, the amplitudes of the two frequencies $f_{1a}$ and $f_{1b}$ are compared with each other to generate a tracking deviation signal.

Figure 11:
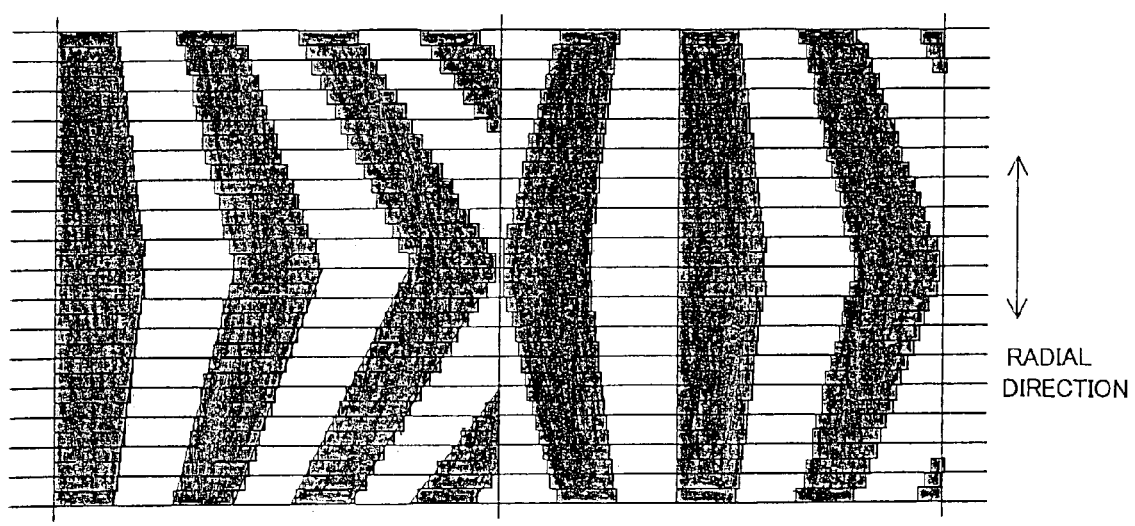
FIG. 11 is a view for explaining a servo pattern of Embodiment 3 of the present invention.

FIG. 11 is a view for explaining another example of the servo pattern according to Embodiment 3 of the present invention.

In this example, the servo pattern has the first burst and the second burst, and in each burst, rectangular patterns are discretely arranged within a track as in FIG. 10.

In this example as well, the deviation signal can be obtained as in FIG. 10. In FIG. 11, an accurate tracking can be carried out even when the disk is eccentric.

Embodiment 4

In this embodiment, radial patterns are formed at the periphery of the magnetic disk for carrying out an accurate tracking of an eccentric magnetic disk.

Figure 12:
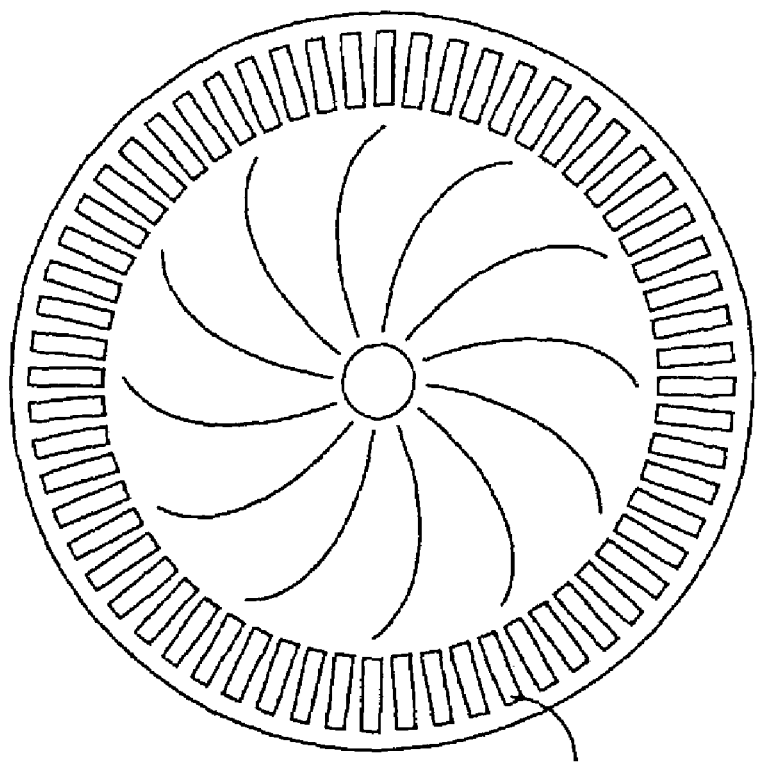
FIG. 12 is a view for explaining a radial pattern according to Embodiment 4 of the present invention.

FIG. 12 is a view for explaining the radial patterns according to Embodiment 4 of the present invention.

Reference numeral 41 in FIG. 12 indicates a radial pattern. The radial patterns 41 are radially extending elongated patterns arranged around the outermost periphery of the magnetic disk equidistantly from the center of the magnetic disk. The radial pattern 41 has, for example, a radial length of about 50 μm and a circumferential length of about 0.25 μm.

When the disk is not eccentric, a predetermined frequency ($=f_0$) is detected on one rotation of the disk by reproducing the radial patterns 41 with the magnetic head. When the disk is eccentric, however, the actual center of rotation is shifted from the ideal center, so that the frequency to be detected varies according to the locations of the radial patterns 41. When the magnetic disk is rotated at a predetermined rate, a frequency lower than the frequency $f_0$ is detected in the radial pattern 41 that is near the actual center of rotation. Conversely, a frequency higher than the frequency $f_0$ is detected from the radial pattern 41 that is distant from the actual center of rotation.

Thus, when the disk is eccentric, different frequencies are detected on one rotation of the disk. When a maximum frequency $f_2$ is detected and a minimum frequency $f_1$ is detected on one rotation (0–360°) of the magnetic disk, the frequencies detected range between $f_1$ and $f_2$ with the frequency $f_0$ in the middle (see FIG. 13).

Figure 13:
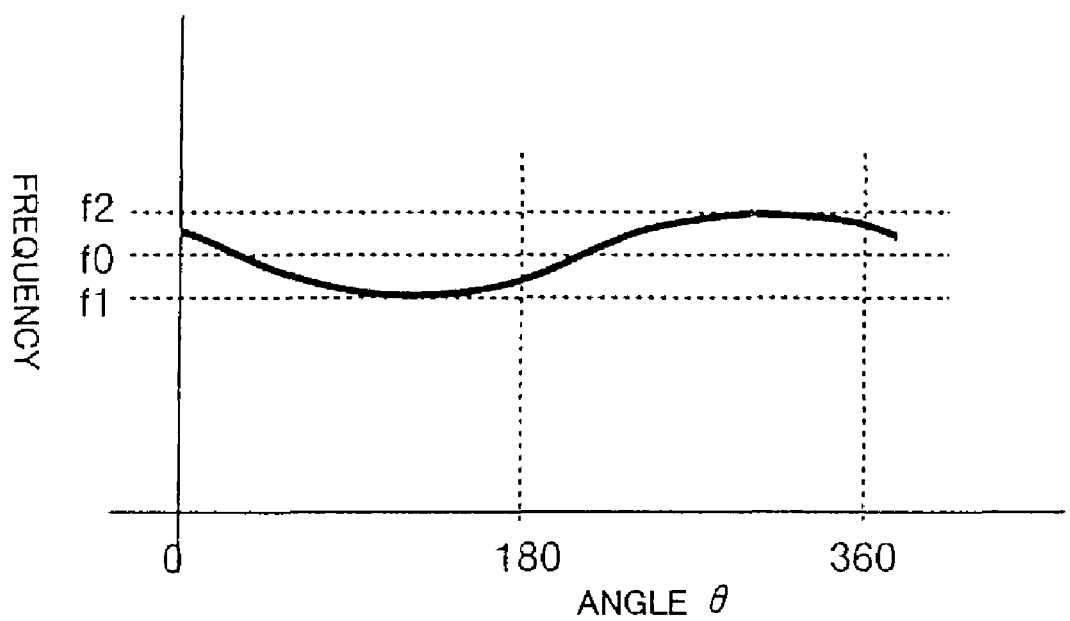
FIG. 13 is a view for explaining change in frequency with an eccentric disk of Embodiment 4 of the present invention.

The variation in the frequency, as in FIG. 13, detected from the radial patterns is decided uniquely by the eccentricity of the magnetic disk. This means that if the range of variation in frequency on one rotation is determined utilizing the radial patterns 41, the eccentricity of the magnetic disk can be obtained. A target frequency table as shown in FIG. 14 is prepared from the eccentricity and stored in the memory.

Referring to FIG. 14, the angle means that of the radial pattern 41 formed from, for example, the reference index of a spindle. The frequency for each angle is known due to the radial patterns 41, so that the target frequency table stores the frequency and voltage that are determined in consideration of the eccentricity of the disk detected with the radial patterns 41.

Now, an explanation will be given on use of the radial patterns 41 to determine the frequency in consideration of the eccentricity and to set the voltage corresponding to the frequency while referring to the table of FIG. 14 for carrying out the tracking.

First, the spindle is equipped with the magnetic head for reproduction of the radial patterns 41 with the magnetic head, the frequency is measured on one rotation of the magnetic disk that is started from the reference index of the spindle, and the frequency is stored in the memory for each location (angle) of the radial pattern. When the disk is eccentric, the detected frequency varies in a predetermined range to show different values depending on the locations of the radial patterns.

The frequency and voltage for every angle is set on the basis of the detected frequency values to prepare the target frequency table as shown in FIG. 14.

Then, when the servo pattern on each track is read out with the magnetic head, a frequency is detected for each track in the servo pattern, since the servo pattern is as shown in FIG. 1, 2 or the like. When the disk is eccentric, the eccentricity should be taken into consideration, and therefore the detected frequency are replaced for the frequency (voltage) determined for the angle in the target frequency table of FIG. 14 to generate the detection signal A. Thereafter, the deviation signal C is generated as in Embodiment 1 for carrying out the tracking.

Thus, an accurate tracking can be carried out even when the disk is eccentric.

According to the present invention, a frequency is detected from the servo pattern formed on the magnetic disk, whereby an accurate tracking can be carried out even when the disk is eccentric. Moreover, a ratio of the servo pattern to the disk can be reduced to a smaller one than conventionally, whereby the storage density of the magnetic disk can be improved.

What is claimed is:

1. A magnetic recording unit, comprising:
a magnetic head;
a magnetic recording medium having a servo pattern for adjusting a position of the magnetic head;
a frequency detecting element for detecting a frequency in the servo pattern on a track corresponding to the position in a radial direction of the magnetic recording medium, on the basis of a reproduction signal obtained by reading the servo pattern with the magnetic head;
a storage element storing in advance information on predetermined frequencies corresponding to the positions of tracks of the magnetic recording medium; and
a tracking element comparing the frequency detected on the track by the frequency detecting element and the information on the frequency corresponding to the same track, the information being stored in the storage element, and generating a signal for adjusting the position of the magnetic head, the signal being generated on the basis of a difference between the frequencies.

2. The magnetic recording unit of claim 1, wherein the servo pattern is an elongated pattern crossing the tracks and has a length varying circumferentially of the magnetic recording medium continuously within a track group consisting of a predetermined number of tracks, and frequency information different for each track is stored in the storage element.

3. The magnetic recording unit of claim 1, wherein the servo pattern is an elongated pattern crossing the tracks and has a length varying circumferentially of the magnetic recording medium discretely within the track group consisting of the predetermined number of tracks, and frequency information for each track is stored in the storage element.

4. The magnetic recording unit of claim 1, wherein the servo pattern is an elongated pattern crossing the tracks, has a length varying circumferentially of the magnetic recording medium continuously within the track group consisting of the predetermined number of tracks and consists of a first burst and a second burst arranged side by side circumferentially of the magnetic recording medium, the first burst and the second burst having opposite tendencies of change in length, and information on frequencies in the first burst and the second burst is stored for each track in the storage element.

5. The magnetic recording unit of claim 1, wherein the servo pattern is an elongated pattern crossing the tracks, has a length varying circumferentially of the magnetic recording medium discretely within the track group consisting of the predetermined number of tracks and consists of a first burst and a second burst arranged side by side circumferentially of the magnetic recording medium, the first burst and the second burst having opposite tendencies of change in length, and information on frequencies in the first burst and the second burst is stored for each track in the storage element.

6. The magnetic recording unit of claim 4 or 5, wherein the magnetic recording medium is a disk-shaped medium that is eccentric with a center of rotation shifted from the designed center of rotation.

7. A magnetic recording unit, comprising:
a magnetic head;
a magnetic recording medium having a servo pattern for adjusting a position of the magnetic head;
a frequency detecting element for detecting a frequency in the servo pattern on a track corresponding to the position in a radial direction of the magnetic recording medium, on the basis of a reproduction signal obtained by reading the servo pattern with the magnetic head;
a storage element for storing in advance information on predetermined frequencies corresponding to the positions of tracks of the magnetic recording medium; and
a tracking element for comparing the frequency detected on the track by the frequency detecting element and the information on the frequency corresponding to the same track, the information being stored in the storage element, and for generating a signal for adjusting the position of the magnetic head, the signal being generated on the basis of a difference between the frequencies,
wherein the magnetic recording medium is a disk-shaped medium having radial patterns arranged around the periphery of the magnetic recording medium, and the frequency detecting element reads the radial patterns on one rotation of the magnetic recording medium to measure a frequency for the one rotation, and, in the presence of variation in the frequency measured on one rotation, compares the measured frequency with a frequency to be detected in the absence of variation to correct the frequency information stored in the storage element.

* * * * *